(12) United States Patent
Choi et al.

(10) Patent No.: US 12,113,430 B2
(45) Date of Patent: Oct. 8, 2024

(54) CONVERTER USING ACTIVE CLAMP AND SOLAR CELL SYSTEM HAVING THE SAME

(71) Applicants: Hyundai Motor Company, Seoul (KR); Kia Corporation, Seoul (KR); Incheon National University Research and Business Foundation, Incheon (KR)

(72) Inventors: Jae Hyuk Choi, Seoul (KR); Han Shin Youn, Incheon (KR); Ji Hoon Lim, Incheon (KR); Dong In Lee, Incheon (KR)

(73) Assignees: Hyundai Motor Company, Seoul (KR); Kia Corporation, Seoul (KR); Incheon National University Research and Business Foundation, Incheon (KR)

( * ) Notice: Subject to any disclaimer, the term of this patent is extended or adjusted under 35 U.S.C. 154(b) by 232 days.

(21) Appl. No.: 17/804,681

(22) Filed: May 31, 2022

(65) Prior Publication Data
US 2023/0039023 A1    Feb. 9, 2023

(30) Foreign Application Priority Data
Aug. 9, 2021  (KR) .................. 10-2021-0104744

(51) Int. Cl.
| | |
|---|---|
| H02M 1/00 | (2007.01) |
| H02J 3/38 | (2006.01) |
| H02M 3/156 | (2006.01) |
| H02S 40/36 | (2014.01) |
| H02M 1/34 | (2007.01) |

(52) U.S. Cl.
CPC .......... *H02M 1/0064* (2021.05); *H02J 3/381* (2013.01); *H02M 1/0058* (2021.05); *H02M 3/1563* (2013.01); *H02S 40/36* (2014.12); *H02J 2300/26* (2020.01); *H02M 1/342* (2021.05)

(58) Field of Classification Search
CPC ............................ H02M 1/348; H02M 1/0058
See application file for complete search history.

(56) References Cited

U.S. PATENT DOCUMENTS 7,864,549 B1 * 1/2011 Wittenbreder, Jr. ........................ H02M 3/33576 363/21.06
9,293,999 B1 * 3/2016 Lam .................. H02M 3/33592
(Continued)

FOREIGN PATENT DOCUMENTS

| CN | 101534061 A | * | 9/2009 | |
| CN | 103023362 A | * | 4/2013 | .............. H02J 3/383 |
(Continued)

*Primary Examiner* — Sisay G Tiku
(74) *Attorney, Agent, or Firm* — Slater Matsil, LLP

(57) ABSTRACT

An embodiment converter includes a magnetic material, a first circuit including a first winding surrounding the magnetic material and a clamp circuit configured to reset a power conversion operation, the first circuit being configured to convert power received from a first input voltage source to provide the converted power to a load, and a second circuit including a second winding surrounding the magnetic material, the second circuit being configured to convert power received from a second input voltage source to provide the converted power to the load and to perform the power conversion operation being reset by the clamp circuit.

20 Claims, 12 Drawing Sheets

(56) References Cited

U.S. PATENT DOCUMENTS

| | | | | |
|---|---|---|---|---|
| 9,780,635 | B1* | 10/2017 | Lam | H02M 3/33569 |
| 9,866,130 | B1* | 1/2018 | Choi | H02M 3/33573 |
| 11,862,981 | B2* | 1/2024 | Gu | H02J 3/381 |
| 2005/0174811 | A1* | 8/2005 | Liu | H02M 3/33592 |
| | | | | 363/21.01 |
| 2010/0067259 | A1* | 3/2010 | Liu | H02M 3/33569 |
| | | | | 363/21.01 |
| 2011/0103100 | A1* | 5/2011 | Hosotani | H02M 3/33571 |
| | | | | 363/21.02 |
| 2012/0257421 | A1* | 10/2012 | Brkovic | H02M 3/33592 |
| | | | | 363/21.07 |
| 2017/0358979 | A1* | 12/2017 | Lam | H02M 3/33569 |
| 2019/0036446 | A1* | 1/2019 | Yang | H02M 1/34 |
| 2020/0177073 | A1* | 6/2020 | Davidson | H02M 3/01 |
| 2021/0078423 | A1* | 3/2021 | Youn | H02M 3/158 |
| 2022/0388415 | A1* | 12/2022 | Choi | H02M 1/348 |
| 2023/0031614 | A1* | 2/2023 | Choi | H02M 3/33507 |

FOREIGN PATENT DOCUMENTS

| | | | | | |
|---|---|---|---|---|---|
| CN | 103532411 | A | * | 1/2014 | |
| CN | 103956924 | A | * | 7/2014 | |
| CN | 203933040 | U | * | 11/2014 | |
| CN | 203933434 | U | * | 11/2014 | |
| CN | 106787911 | A | * | 5/2017 | |
| CN | 116885780 | A | * | 10/2023 | |
| EP | 3979492 | B1 | * | 11/2023 | H02J 3/381 |
| WO | WO-2014206463 | A1 | * | 12/2014 | H02M 3/158 |

* cited by examiner

CONVERTER USING ACTIVE CLAMP AND SOLAR CELL SYSTEM HAVING THE SAME

CROSS-REFERENCE TO RELATED APPLICATIONS

This application claims the benefit of Korean Patent Application No. 10-2021-0104744, filed on Aug. 9, 2021, which application is hereby incorporated herein by reference.

TECHNICAL FIELD

The present disclosure relates to a converter using an active clamp and a solar cell system having the same.

BACKGROUND

A solar cell system is composed of an array by connecting photovoltaic (hereinafter "PV") modules in series or in parallel for a required power generation. A plurality of PV modules constituting the array may have different power generation amounts, and an imbalance of voltage and current generated when the power generation amounts are different may cause overall power loss. This results in a decrease in power production of an entire solar cell system because a PV module with a small amount of power follows a low short-circuit current.

A disadvantage of the solar cell system due to power imbalance is more pronounced in a solar system installed in a vehicle, which is a mobile means.

As a utilization of the solar cell system increases, research of improvement measures for improving a power imbalance issue is intensifying.

SUMMARY

Embodiments of the present disclosure can solve problems occurring in the prior art while advantages achieved by the prior art are maintained intact.

An embodiment of the present disclosure provides a solar cell system capable of compensating for power imbalance between PV modules.

In addition, an embodiment of the present disclosure provides a solar cell system capable of using a converter of a smaller size.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a converter using a clamp circuit includes a magnetic material, a first circuit, and a second circuit. The first circuit includes a first winding surrounding the magnetic material and a clamp circuit for resetting a power conversion operation and converts power received from a first input voltage source to provide the converted power to a load. The second circuit includes a second winding surrounding the magnetic material and converts power received from a second input voltage source to provide the converted power to the load, and performs a power conversion operation that is reset by the clamp circuit.

In an embodiment, the second winding may be in a coupling state with the first winding.

In an embodiment, the first circuit may further include a first main switch connected to the first input voltage source and a first inductor connected to the first winding.

In an embodiment, the clamp circuit may include a clamp switch connected to the first main switch and a clamp capacitor between the clamp switch and the first inductor and connected in series with the clamp switch and the first inductor.

In an embodiment, the second circuit may be a primary side circuit structure of a flyback converter including a second main switch connected to the second input voltage source and a second inductor connected to the second winding.

In an embodiment, the first main switch and the second main switch may be turned on or turned off at the same time, and the clamp switch may operate complementary to the first main switch.

In an embodiment, during a first period, the first and second main switches may be turned on, the first circuit and the second circuit each may generate a current flow in a closed circuit, and a current flow between the first and second windings coupled to each other may be induced.

In an embodiment, during a second period and a third period subsequent to the first period, the first and second main switches may be turned off to discharge electrical energy stored in the first and second inductors.

In an embodiment, during a fourth period subsequent to the third period, the clamp switch may be turned on to decrease a magnetizing current of the first circuit to a negative value until an offset of the magnetizing current is removed.

In an embodiment, during a fifth period subsequent to the fourth period, the first and second main switches may be conducted through a parasitic capacitor.

In an embodiment, in a sixth period subsequent to the fifth period, the first and second main switches may be turned on to allow the first and second circuits to be a zero voltage switching (ZVS).

According to an embodiment of the present disclosure, a solar cell system includes a first photovoltaic (PV) module and a second PV module connected in series with each other and a converter that provides power from the first and second PV modules to a load, using a magnetic material having a multi-winding structure, and the converter includes a clamp circuit that resets a leakage flux generated around windings surrounding the magnetic material.

In an embodiment, the converter may include a first circuit that converts power from the first PV module and resets an operation of the converter using the clamp circuit and a second circuit that converts power from the second PV module. The first circuit may include a first winding surrounding a first region of the magnetic material, a first main switch connected between the first PV module and the clamp circuit, and a first inductor connected between the first winding and the clamp circuit.

In an embodiment, the clamp circuit may include a clamp switch connected to the first main switch and a clamp capacitor between the clamp switch and the first inductor and connected in series with the clamp switch and the first inductor.

In an embodiment, the converter may be a primary side circuit structure of a flyback converter including a second winding surrounding a second region of the magnetic material, a second main switch connected to the second PV module, and a second inductor connected to the second winding.

In an embodiment, the first winding and the second winding may be in a coupling state.

In an embodiment, the first main switch and the second main switch may be turned on or turned off at the same time, and the clamp switch may operate complementary to the first main switch.

In an embodiment, during an unbalance compensation period, the first and second main switches may be turned on, the first circuit and the second circuit each may generate a current flow in a closed circuit, and a current flow between the first and second windings coupled to each other may be induced.

In an embodiment, during a magnetizing current offset period, the clamp switch may be turned on to decrease a magnetizing current of the first circuit to a negative value until an offset of the magnetizing current is removed.

In an embodiment, a solar cell system may further include a controller that charges a battery with power generated from the first PV module and the second PV module, based on a maximum power point tracking (MPPT) control.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
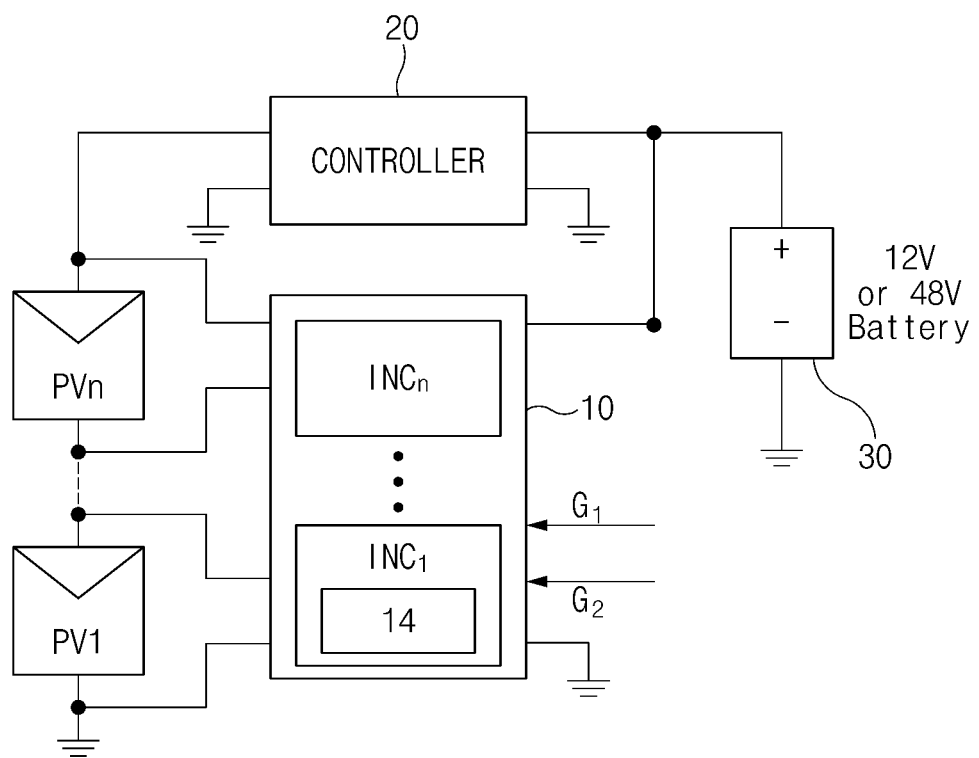
FIG. 1 is a block diagram illustrating a configuration of a solar cell system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 1B.

FIG. 1 is a block diagram illustrating a configuration of a solar cell system according to an embodiment of the present disclosure.

Referring to FIG. 1, a solar cell system according to an embodiment of the present disclosure may include a first PV module PV1 to an n-th (where, 'n' is a natural number greater than or equal to 2) PV module PVn, a differential power processing (hereinafter, referred to as 'DPP') converter 10, a controller 20, and a battery 30. The first PV module PV1 to the n-th PV module PVn may constitute a solar panel and may convert solar energy into electrical energy. The solar panel may be installed on the roof of a vehicle, but the scope of the present disclosure is not limited thereto, and the solar panel may be installed wherever the solar panel can be installed, such as a door, a lid, a bonnet (i.e., a trunk), etc. The first PV module PV1 to the n-th PV module PVn are solar cells, and as a type of the solar cell, an amorphous silicon solar cell or a crystalline silicon solar cell may be used. In particular, a dye-sensitized solar cell, a perovskite-based solar cell, an organic solar cell, a cadium-theryllium (CdTe) solar cell, a copper-indium-gallium-selenium (CIGS) solar cell, etc. may be used individually or in combination.

The DPP converter 10 is electrically connected to the first PV module PV1 to the n-th PV module PVn, and may control an operation of converting power generated by the first PV module PV1 to the n-th PV module PVn. The DPP converter 10 is bidirectional and may be implemented based on a DC-DC converter to which an electrical insulation is applied. The DPP converter 10 may use an integrated magnetic material for a multi-winding structure. In particular, the DPP converter 10 may include a clamp circuit for resetting a power conversion operation. A specific configuration and operation of a clamp circuit 14 will be described later.

The controller 20 may control an output of the DPP converter 10. The controller 20 may perform a maximum power point tracking (MPPT) control so as to control the power generated by the first PV module PV1 to the n-th PV module PVn. Specifically, the controller 20 may perform the MPPT to output a maximum power from the first PV module PV1 to the n-th PV module PVn, based on a preset algorithm, by using an output voltage and an output current of the first PV module PV1 to the n-th PV module PVn, and for this, the controller 20 may control an output and an operation of the DPP converter 10.

Since the controller 20 should control converters one-to-one, the size of the controller 20 increases depending on the number of converters. However, in the DPP converter 10 according to an embodiment of the present disclosure, only one circuit part among the plurality of circuit parts includes the clamp circuit, and since a reset of all circuit parts is controlled by using one clamp circuit, the size of the controller 20 may be reduced.

The battery 30 may correspond to a voltage source connected to an electric circuit, and may mean, for example, a rechargeable battery of an electric vehicle.

Hereinafter, a detailed configuration of the DPP converter and a control signal generator and its operation will be described as follows.

Figure 2:
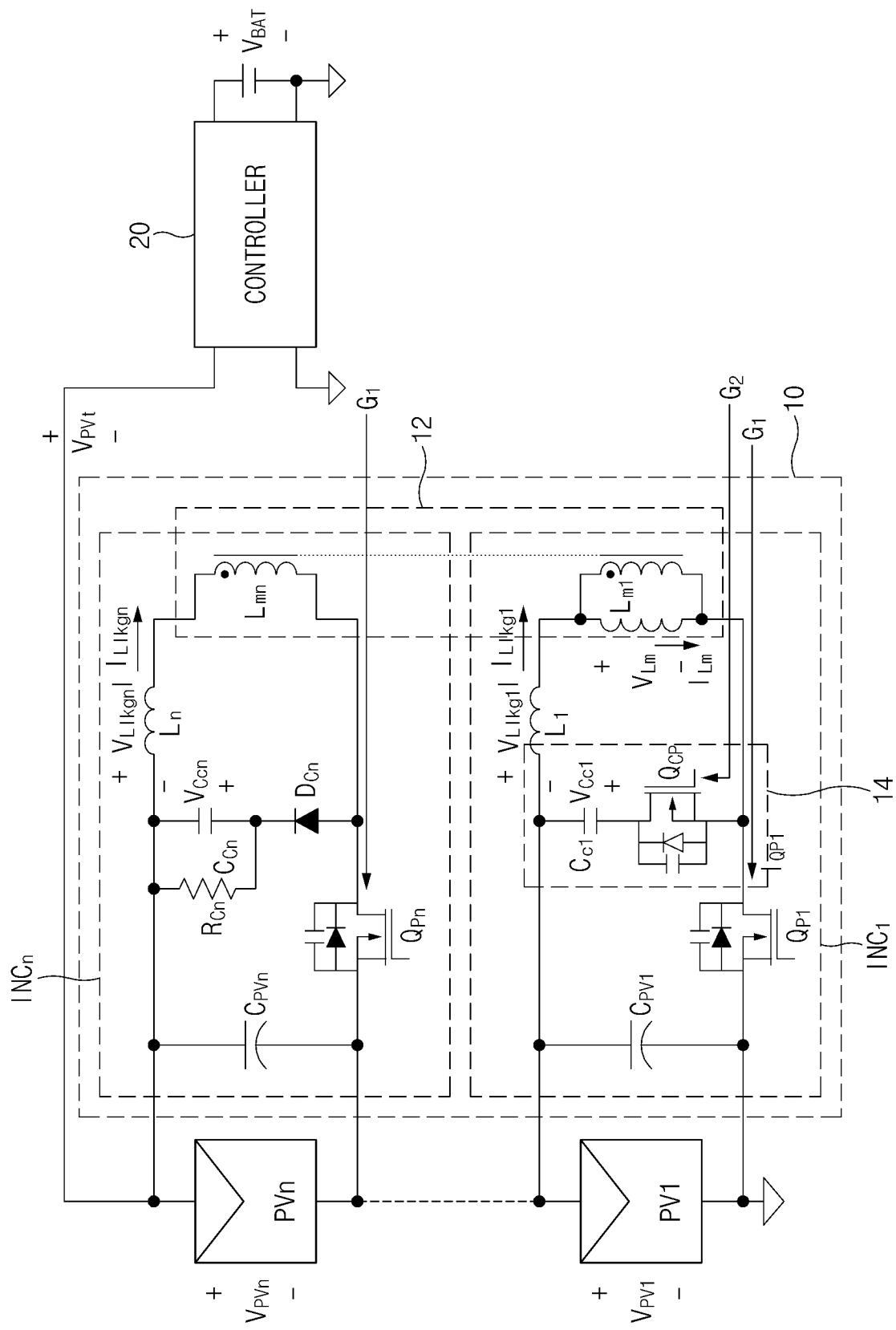
FIG. 2 is a circuit diagram illustrating a configuration of a differential power processing (DPP) converter.

FIG. 2 is a circuit diagram illustrating a configuration of a DPP converter.

Referring to FIG. 2, the DPP converter 10 according to an embodiment of the present disclosure may include a first circuit INC1 to an n-th circuit INCn. The first circuit INC1 may be connected to the first PV module PV1 and may induce a current flow through a first winding Lm1 based on the power generated by the first PV module PV1. The first circuit INC1 may include the first winding Lm1, a first inductor L1 connected in series with the first winding Lm1, the clamp circuit 14 connected with the first inductor L1, and a first main switch Qp1.

The clamp circuit 14 may include a clamp switch Qcp connected to the first main switch Qp1, and a clamp capacitor Cc1 connected between the clamp switch Qcp and the first inductor L1. The clamp circuit 14 may generate clamping electrical energy based on the power generated by the first PV module PV1 and may provide the clamping electrical energy to a load. In this case, in the present embodiment of the present disclosure, the load may be the controller 20. Also, the clamp circuit 14 may reset the power conversion operation of the first circuit INC1 to the n-th circuit INCn.

The n-th circuit INCn may be connected to the n-th PV module PVn and may induce a current flow through an n-th winding Lmn based on the power generated by the n-th PV module PVn. The n-th circuit INCn may include the n-th winding Lmn, an n-th inductor Ln connected in series with the n-th winding Lmn, and an n-th RCD snubber circuit Rcn, Ccn, and Dcn connected to the n-th inductor Ln, and an n-th main switch Qpn.

As in the above description, second to (n−1)-th input circuits may be implemented as a primary side circuit structure of a flyback converter in the same way as the n-th circuit INCn.

The DPP converter 10 according to an embodiment of the present disclosure corresponds to the primary side circuit structure corresponding to an input circuit of a general converter, and has a state in which a circuit structure of a secondary side corresponding to an output circuit is omitted. The DPP converter 10 according to an embodiment of the present disclosure may control a driving of the clamp circuit 14 of the first circuit INC1 and the first circuit INC1 to the n-th circuit INCn while omitting the circuit structure of the secondary side. By doing so, it is possible to perform the power conversion operation and also to reset the power conversion operation.

Conventional converters for converting the power of 'n' PV modules use 'n' secondary side circuit parts, but the converter according to an embodiment of the present disclosure removes 'n' secondary side circuit parts, so that the size of the converter may be greatly reduced.

Figure 3:
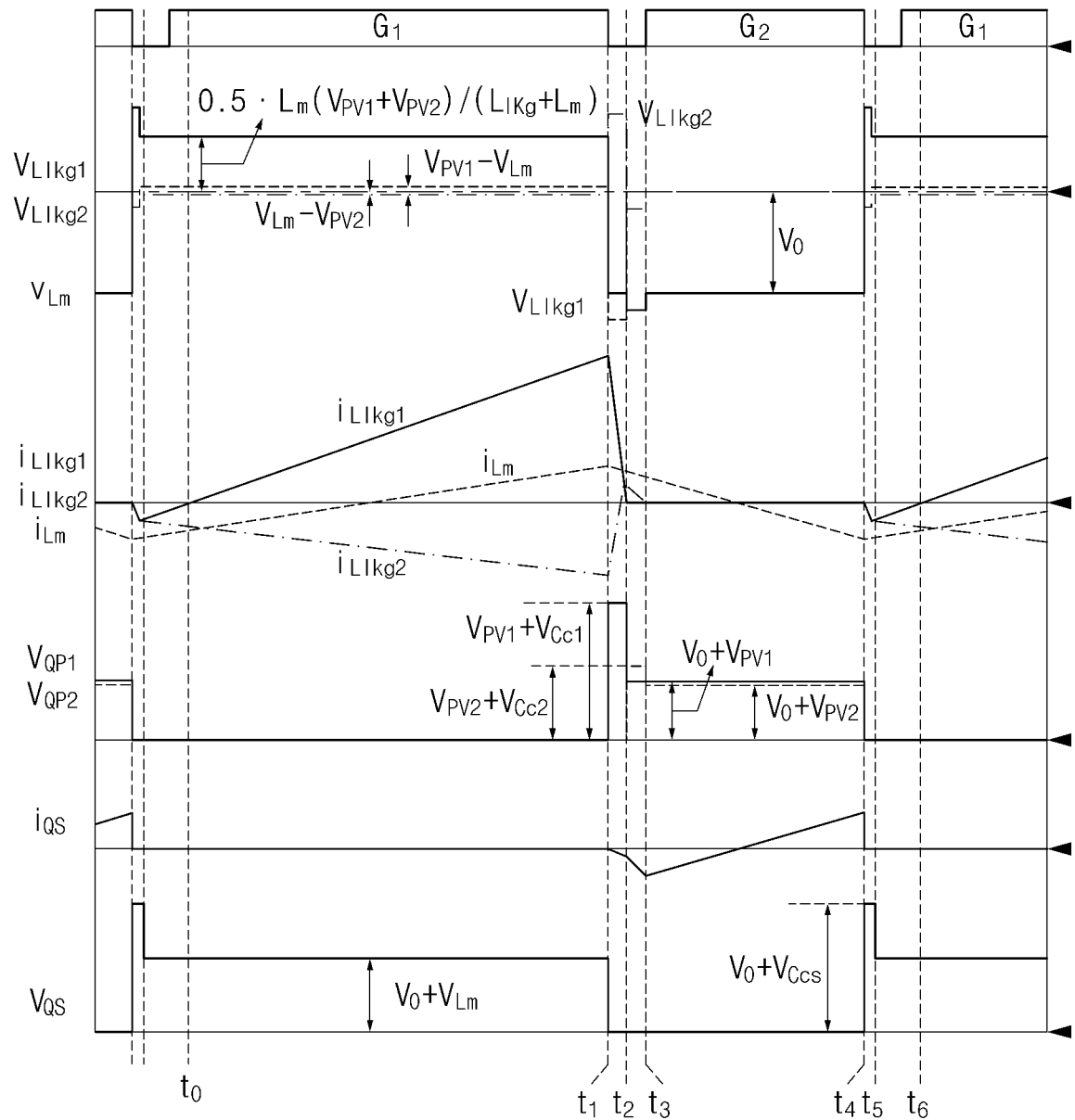
FIG. 3 is a timing diagram describing an operation of a DPP converter according to an embodiment of the present disclosure.

FIG. 3 is a timing diagram describing an operation of a DPP converter according to an embodiment of the present disclosure. FIGS. 4 to 9 are diagrams describing an operation of the DPP converter 10 according to the timing diagram illustrated in FIG. 3. FIGS. 3 to 9 are diagrams based on an embodiment of a DPP converter implemented with two PV modules. In addition, FIGS. 4 to 9 illustrate the DPP converter 10 operating based on a case in which the amount of power generated by the first PV module PV1 is greater than that of the second PV module PV2.

Referring to FIGS. 4 to 9, the operation of the DPP converter according to control signals will be described as follows.

The DPP converter 10 may be controlled by a first control signal G1 and a second control signal G2. The first control signal G1 may simultaneously turn on or off the first main switch Qp1 and a second main switch Qp2. The second control signal G2 controls the clamp switch Qcp of the first circuit INC1. Operation timings of the first control signal G1 and the second control signal G2 may be complementary to each other. That is, when the first control signal G1 is in a turn-on state, the second control signal G2 may be in a turn-off state. When the first main switch Qp1 to the n-th main switch Qpn and the clamp switch Qcp are implemented with transistors of the same type, the first control signal G1 and the second control signal G2 may be waveforms having an opposite phase to each other.

Figure 4:
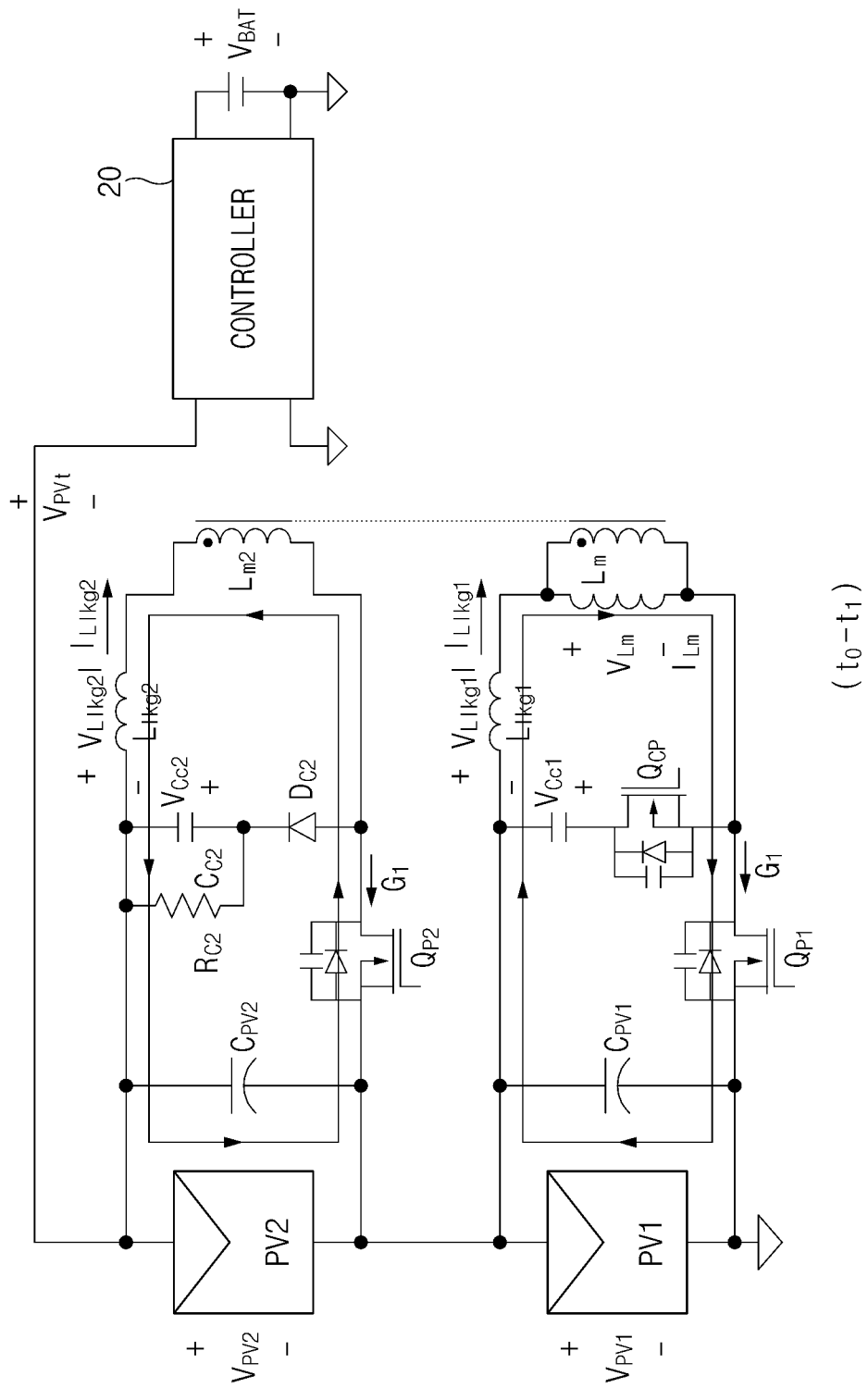
FIGS. 4 to 9 are diagrams describing an operation of a DPP converter according to a timing diagram.

Referring to FIGS. 3 and 4, during a first period t0 to t1, the first and second main switches Qp1 and Qp2 may be turned on in response to the first control signal G1. The first period t0 to t1 may be a period for compensating for imbalance between input voltages of the first and second circuits INC1 and INC2. Since the amount of power generation of the first PV module PV1 is greater than that of the second PV module PV2, a first PV module voltage VPV1 is greater than a second PV module voltage VPV2. Accordingly, a voltage VLm applied to the first winding Lm1 may have a value between the first PV module voltage VPV1 and the second PV module voltage VPV2, and a magnetizing current iLm (or magnetizing inductance current) flowing through the first winding Lm1 may increase with a first slope.

A first leakage inductance Llkg1 of the first winding Lm1 corresponding to the first PV module PV1 may receive a positive voltage VPV1−VLm, and a first leakage current iLlkg1 of the first leakage inductance Llkg1 may increase. A second leakage inductance Llkg2 of a second winding Lm2 corresponding to the second PV module PV2 may receive a voltage VPV2−VLm having a negative value, and a leakage current iLlkg2 of the second leakage inductance Llkg2 may be decreased. Due to a difference in power generation between the first PV module PV1 and the second PV module PV2, the first leakage current iLlkg1 corresponding to the first PV module PV1 may increase with a second slope greater than the first slope. In addition, the second leakage current iLlkg2 corresponding to the second PV module PV2 may decrease with a third slope.

In this case, since the first winding Lm1 and the second winding Lm2 of the DPP converter 10 are coupled, the second leakage current iLlkg2 is as follows:

$$iLlkg2=-(iLlkg1-iLm).$$

That is, it may be seen that the surplus current from the first PV module PV1 flows into the second PV module PV2 during the first period to compensate for the imbalance of the generated power between the PV modules.

Figure 5:
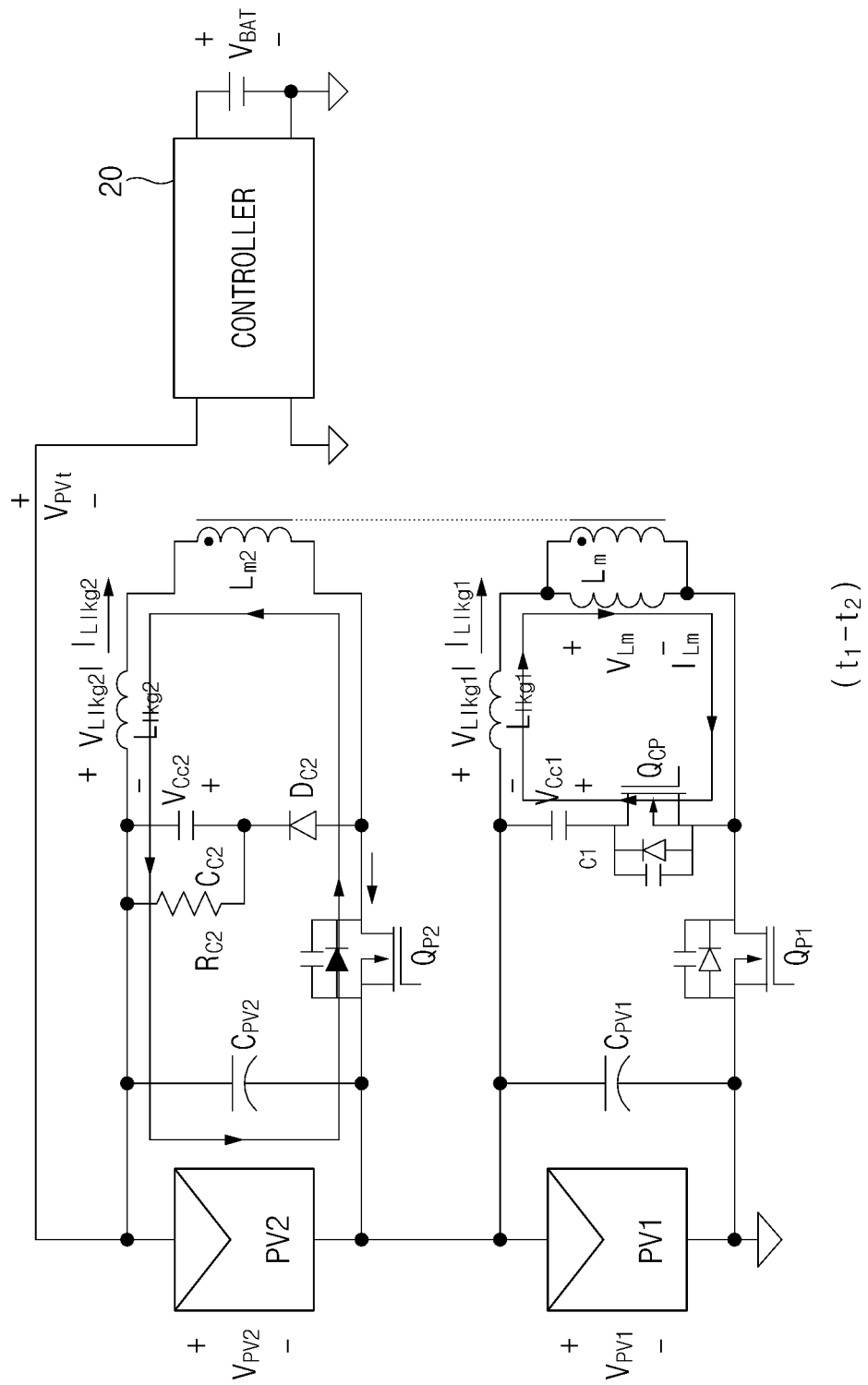

Referring to FIGS. 3 and 5, during a second period t1 to t2, the first and second main switches Qp1 and Qp2 are turned off, and the clamp switch Qcp may be conducted by the electrical energy stored in the first leakage inductance Llkg1. The energy stored in the first leakage inductance Llkg1 is consumed through a first RCD snubber circuit Rc1, Cc1, and Dc1, and the energy stored in the second leakage inductance Llkg2 may be discharged to the second PV module PV2. In the DPP converter 10 of the solar cell system according to the present embodiment of the present disclosure, since the magnetizing current is removed and the number of windings is decreased, energy emission through the leakage inductance is reduced. Accordingly, a snubber loss may be reduced.

Figure 6:
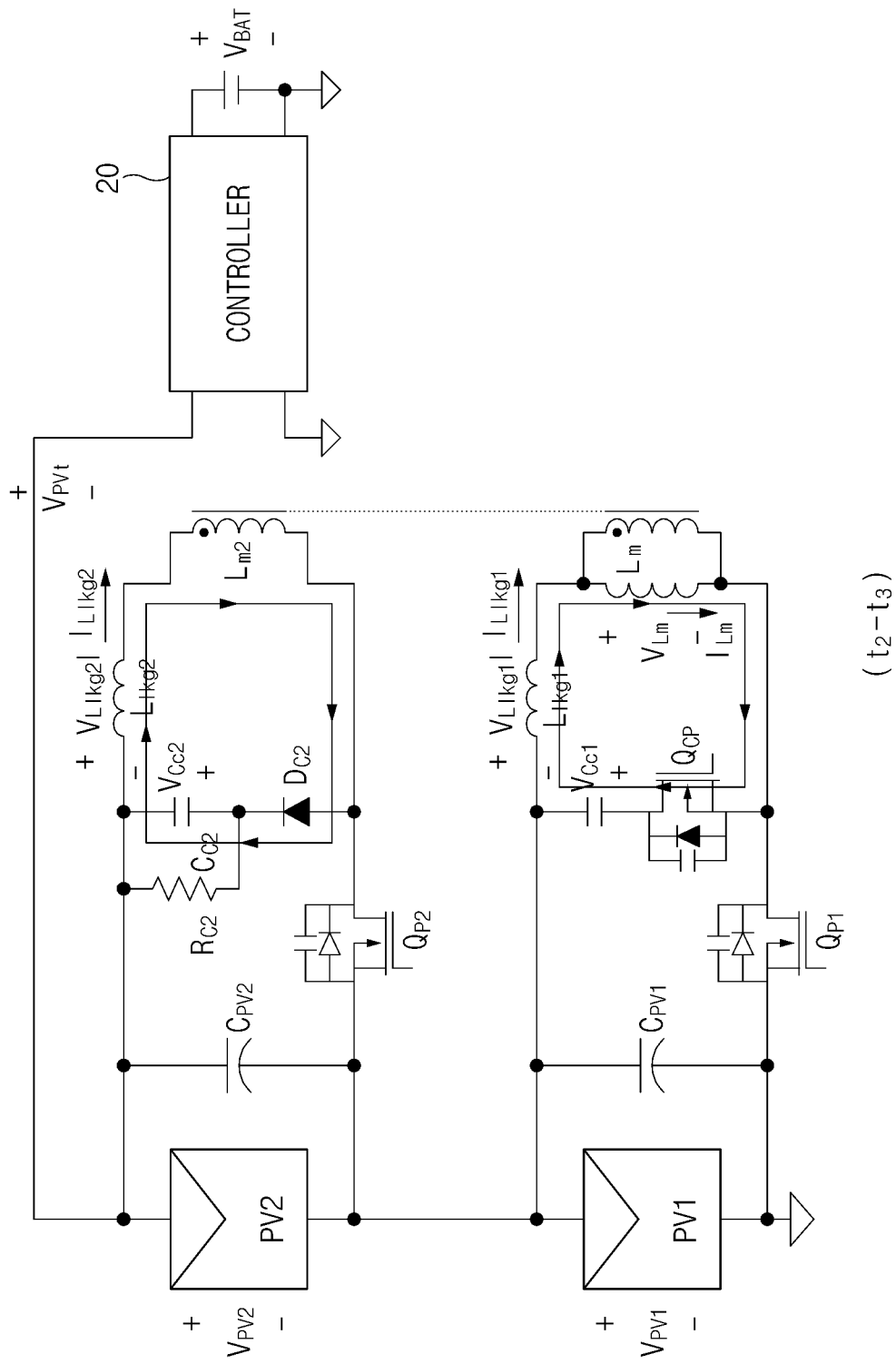

Referring to FIGS. 3 and 6, during a third period t2 to t3, the first and second main switches QP1 and QP2 may maintain the turned-off state, and the clamp switch Qcp may have a conducted state through a body diode.

The energy stored in the second leakage inductance Llkg2 is consumed through an RCD snubber Rc2, Cc2, and Dc2, and since the voltage of the inductance Lm corresponds to "−Vcc−VLlkg", the magnetizing current iLm may decrease.

Figure 7:
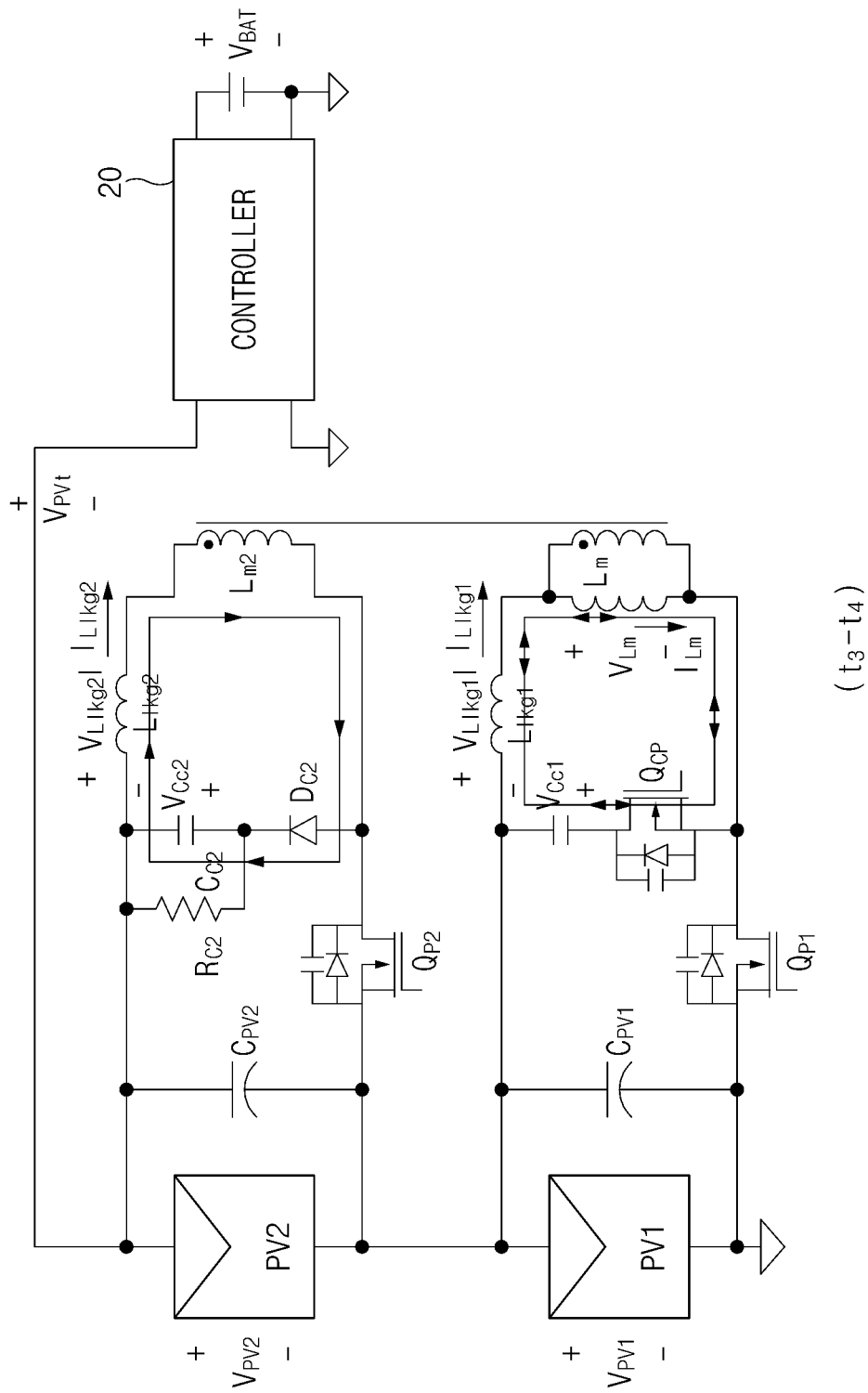

Referring to FIGS. 3 and 7, during a fourth period t3 to t4, the clamp switch Qcp may be turned on in response to the second control signal G2. The fourth period t3 to t4 may be a period for removing an offset of the magnetizing current iLm in the first and second circuits INC1 and INC2.

The magnetizing current iLm of the inductance Lm is gradually decreased, and the DPP converter 10 may be reset while the value of current is changed from positive to negative. In particular, as illustrated in FIG. 3, it may be seen that the offset of the magnetizing current iLm becomes '0' in the fourth period t3 to t4. As described above, since the offset of the magnetizing current iLm does not exist, it may be seen that the size of the DPP converter 10 may be reduced.

Figure 8:
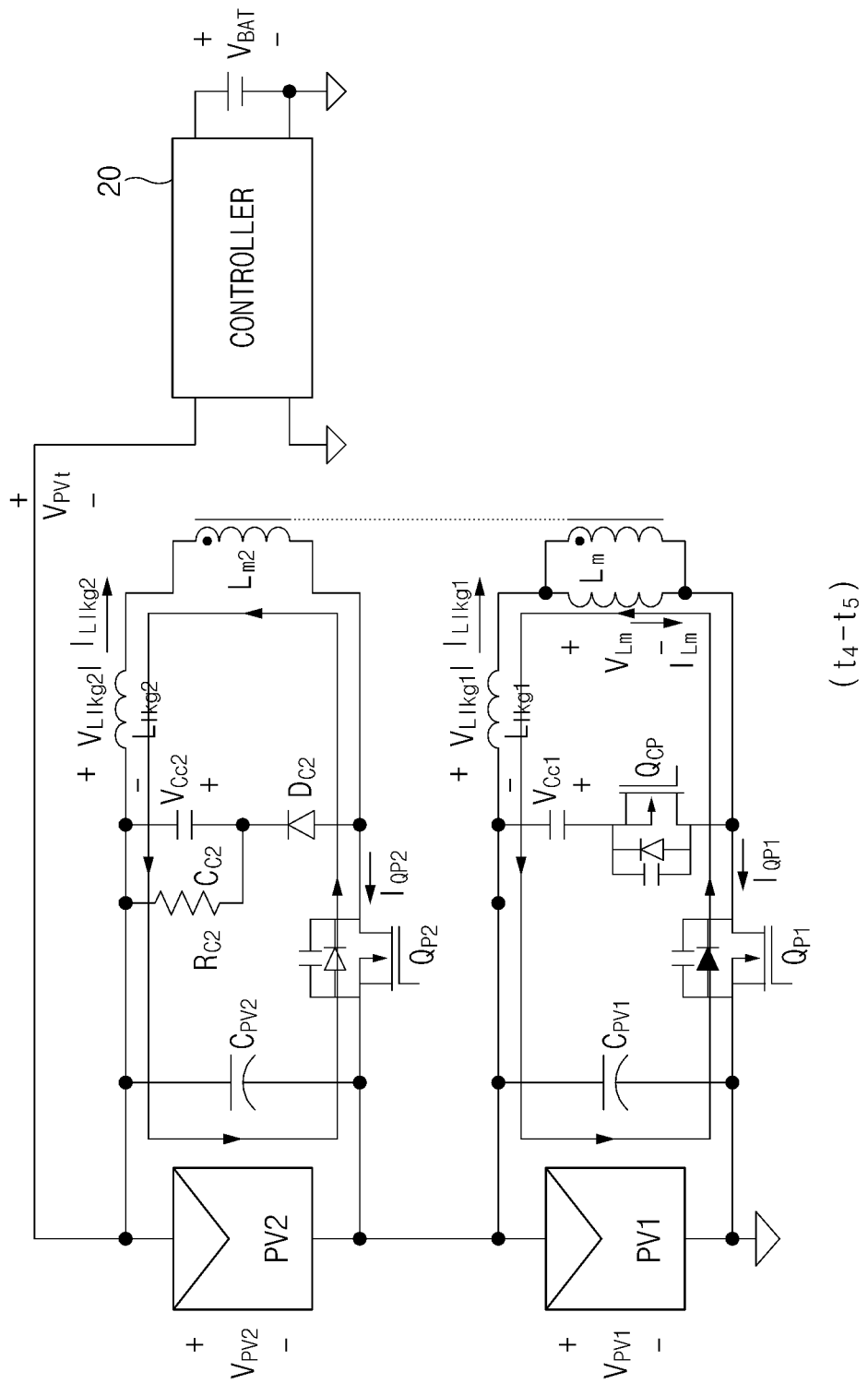

Referring to FIGS. 3 and 8, during a fifth period t4 to t5, the first main switch Qp1 may be conducted by a parasitic capacitor and the body diode, and the second main switch Qp2 may be conducted through the parasitic capacitor. The clamp switch Qcp may be conducted through the parasitic capacitor.

Figure 9:
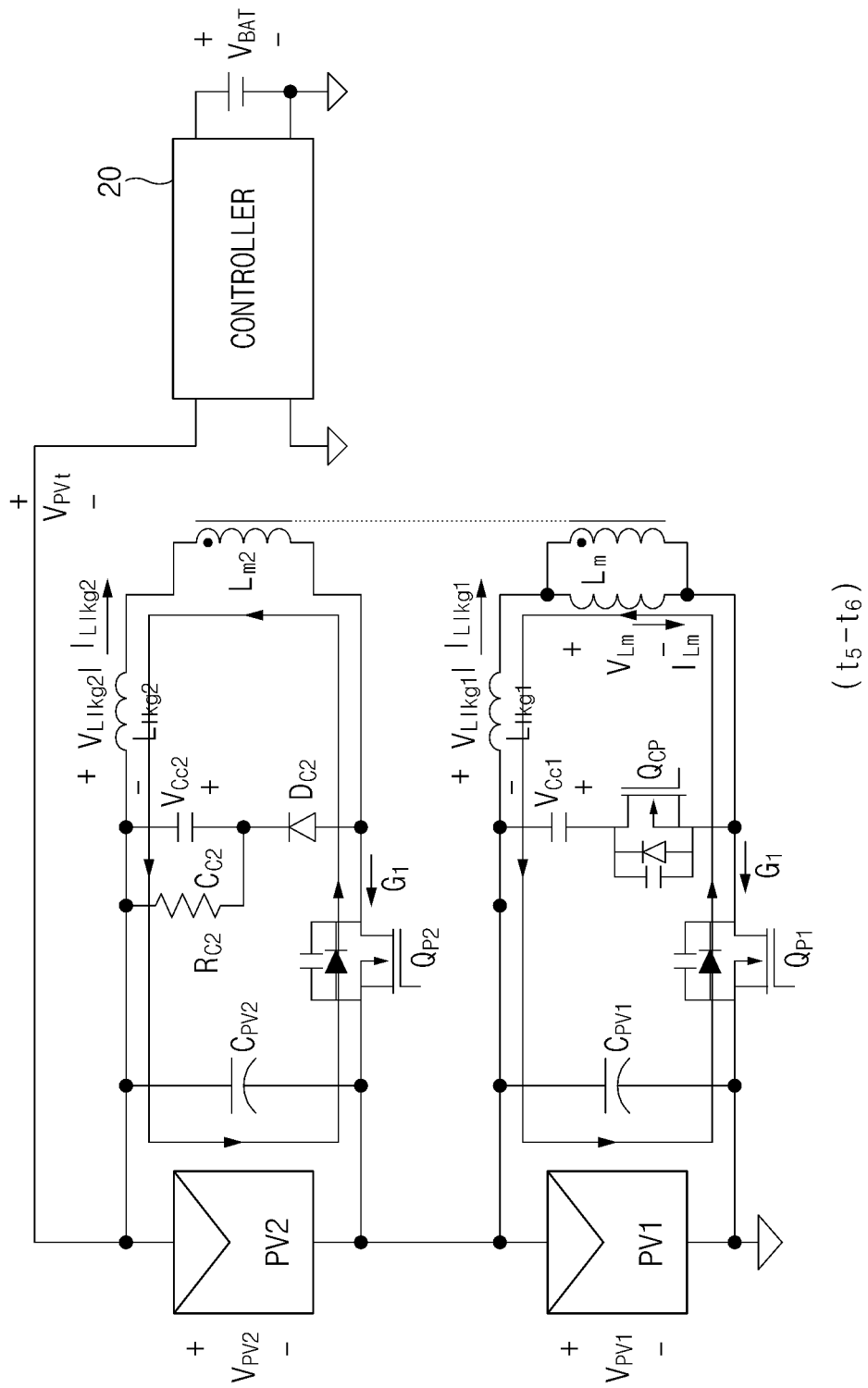

Referring to FIGS. 3 and 9, the first and second main switches Qp1 and Qp2 that were in the conducted state through the body diode in a sixth period t5 to t6 may be turned on by the first control signal G1.

Accordingly, a positive voltage VPV1−VLm is applied to the first leakage inductance Llkg1, so that the first leakage current iLlkg1 of the first leakage inductance Llkg1 may increase. In addition, a negative voltage is applied to the second leakage inductance Llkg2, so that the second leakage current iLlkg2 of the second leakage inductance Llkg2 may be decreased. While the first leakage current iLlkg1 and the second leakage current iLlkg2 have negative values, the first and second main switches QP1 and QP2 are turned on, so that a zero voltage switching (ZVS) of the first and second main switches QP1 and QP2 may be performed.

As described above, since the surplus current and the surplus power from the first PV module PV1 to the DPP converter 10 are provided to the second PV module PV2, the current circulation is performed only within the input circuit of the DPP converter 10, and an average current on the secondary side becomes '0'.

Figure 10:
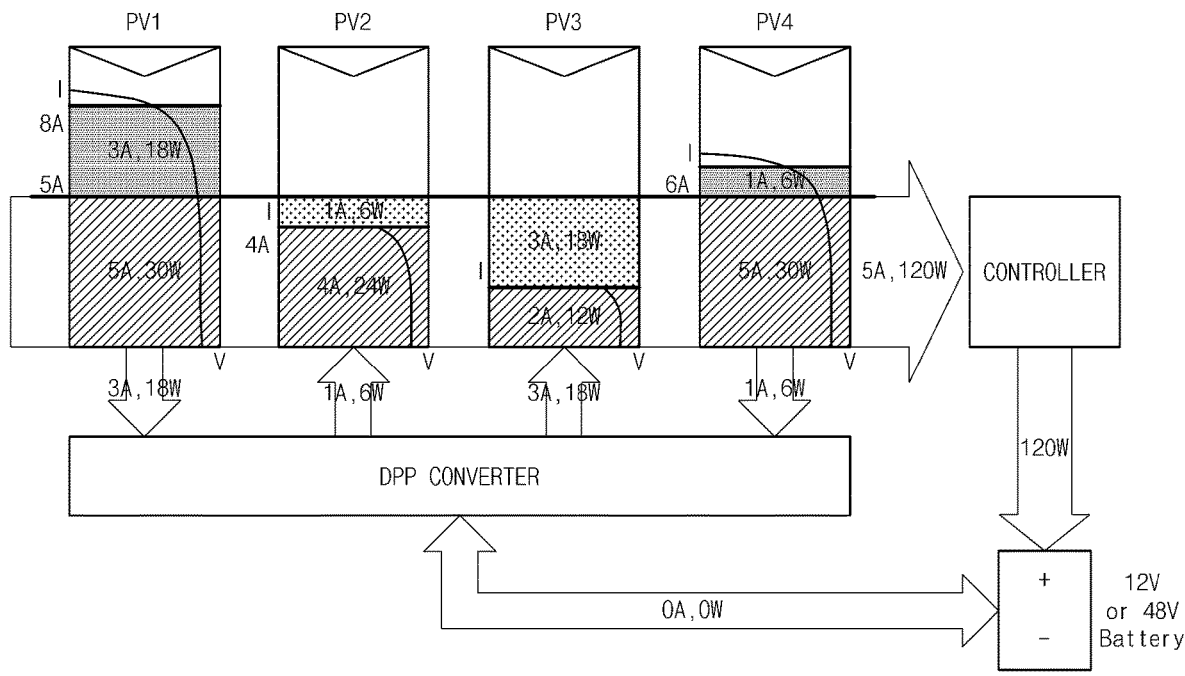
FIG. 10 is a schematic diagram describing a process of how the solar cell system according to an embodiment of the present disclosure solves a charge imbalance.

FIG. 10 is a schematic diagram describing a process of how the solar cell system according to an embodiment of the present disclosure solves a charge imbalance. FIG. 10 illustrates a solar system having four PV modules.

Referring to FIG. 10, in a solar cell system according to an embodiment of the present disclosure, as described based on FIG. 5, while the main switches of the DPP converter are turned on, the surplus current and the surplus power of the PV modules may be provided to the DPP converter, and a supplemental current and a supplemental power of the DPP converter may be provided to the PV modules, which are modules lacking in charge. For example, the surplus current and surplus power (3 A and 18 W) of the first PV module PV1 and the surplus current and surplus power (1 A and 6 W) of a fourth PV module PV4 may be provided to the DPP converter.

In addition, the supplemental current and supplemental power (1 A and 6 W) of the DPP converter may be provided to the second PV module PV2, and the supplemental current and supplemental power (3 A and 18 W) are provided to a third PV module PV3.

Figure 11A:
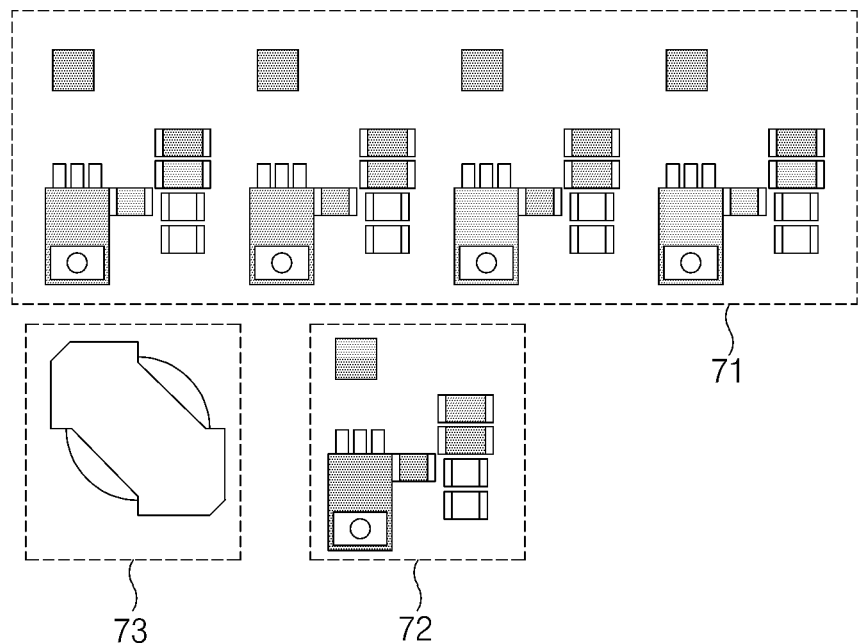
FIGS. 11A and 11B are diagrams illustrating a configuration of a DPP converter according to an embodiment of the present disclosure in comparison with a conventional DPP converter.
Figure 11B:
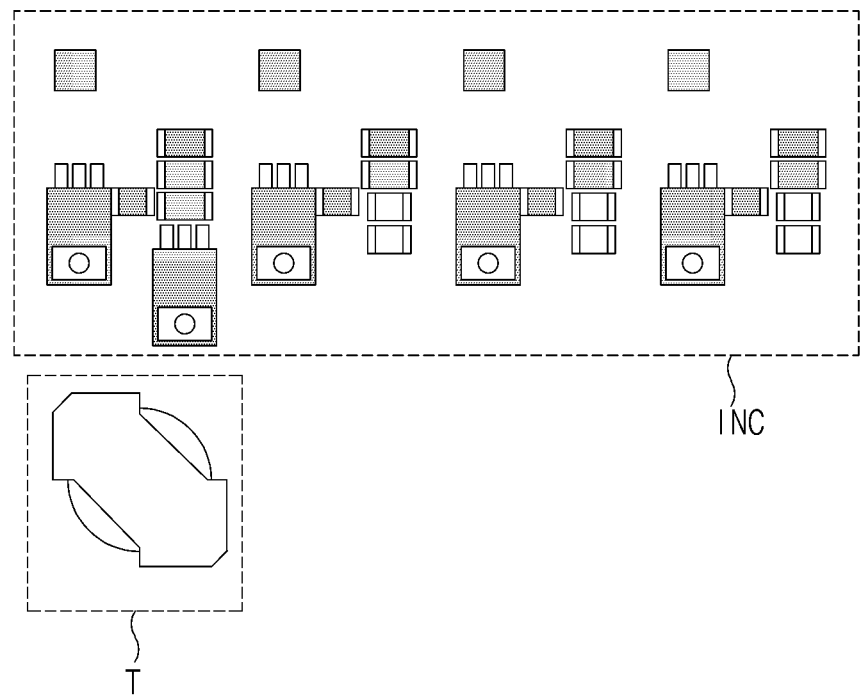

FIGS. 11A and 11B are diagrams illustrating a configuration of a DPP converter according to an embodiment of the present disclosure in comparison with a conventional DPP converter.

Referring to FIG. 11A, the conventional DPP converter may include a primary side circuit 71, a secondary side circuit 72, and a transformer 73 including a magnetic material and a winding.

In contrast, referring to FIG. 1B, a circuit part of the DPP converter 10 according to the embodiment of the present disclosure has only a first circuit part INC corresponding to the primary side circuit part, so that the size may be decreased as much as the secondary side circuit part is removed.

In addition, since the operation of the DPP converter 10 is performed by a soft switching, it is possible to reduce energy loss.

According to an embodiment of the present disclosure, since surplus power from a PV module is provided to another PV module, power imbalance between PV modules may be compensated.

In addition, according to an embodiment of the present disclosure, since it is possible to reduce the size of a converter for converting the power generated by the PV module, the size of the solar cell system may be reduced.

In addition, various effects may be provided that are directly or indirectly understood through the present disclosure.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A converter comprising:
   a magnetic material;
   a first circuit configured to convert power received from a first input voltage source to provide the converted power to a load, and to reset an operation of the power converter using a clamp circuit, the first circuit comprising:
   a first winding surrounding the magnetic material,
   a first main switch connected to the first input voltage source,
   a first inductor connected to the first winding, and
   the clamp circuit; and
   a second circuit configured to convert power received from a second input voltage source to provide the converted power to the load and to perform a power conversion operation being reset by the clamp circuit, wherein the second circuit is a primary side circuit structure of a flyback converter, the second circuit comprising:
- a second winding surrounding the magnetic material,
- a second main switch connected to the second input voltage source, and
- a second inductor connected to the second winding;

wherein the clamp circuit comprises:
- a clamp switch connected to the first main switch, and
- a clamp capacitor between the clamp switch and the first inductor and connected in series with the clamp switch and the first inductor, wherein the first main switch and the second main switch are configured to be turned on or turned off at a same time, and the clamp switch is configured to operate complementary to the first main switch.

2. The converter of claim 1, wherein, during a first period, the first main switch and the second main switch are turned on, the first circuit and the second circuit each generate a current flow in a closed circuit, and a current flow between the first winding and the second winding coupled to each other is induced.

3. The converter of claim 2, wherein, during a second period and a third period subsequent to the first period, the first main switch and the second main switch are turned off to discharge electrical energy stored in the first inductor and the second inductor.

4. The converter of claim 3, wherein, during a fourth period subsequent to the third period, the clamp switch is turned on to decrease a magnetizing current of the first circuit to a negative value until an offset of the magnetizing current is removed.

5. The converter of claim 4, wherein, during a fifth period subsequent to the fourth period, the first main switch and the second main switch are conducted through a parasitic capacitor.

6. The converter of claim 5, wherein, in a sixth period subsequent to the fifth period, the first main switch and the second main switch are turned on to allow the first circuit and the second circuit to be a zero voltage switching.

7. A solar cell system comprising:
a first photovoltaic (PV) module and a second PV module connected in series with each other;
a first circuit configured to convert power from the first PV module and to reset an operation of the converter using a clamp circuit, wherein the first circuit comprises:
- a first winding surrounding a first region of a magnetic material,
- a first main switch connected between the first PV module and the clamp circuit, and
- a first inductor connected between the first winding and the clamp circuit; and
a second circuit configured to convert the power from the second PV module, wherein:
the clamp circuit comprises:
- a clamp switch connected to the first main switch, and
- a clamp capacitor between the clamp switch and the first inductor and connected in series with the clamp switch and the first inductor;
the converter is a primary side circuit structure of a flyback converter and comprises:
- a second winding surrounding a second region of the magnetic material,
- a second main switch connected to the second PV module, and
- a second inductor connected to the second winding, and
the first main switch and the second main switch are configured to be turned on or turned off at a same time, and
the clamp switch is configured to operate complementary to the first main switch.

8. The solar cell system of claim 7, wherein the first winding and the second winding are in a coupling state.

9. The solar cell system of claim 7, wherein, during an unbalance compensation period, the first main switch and the second main switch are turned on, the first circuit and the second circuit each generate a current flow in a closed circuit, and a current flow between the first winding and the second winding coupled to each other is induced.

10. The solar cell system of claim 9, wherein, after the unbalance compensation period, the clamp switch is turned on to decrease a magnetizing current of the first circuit to a negative value until an offset of the magnetizing current is removed.

11. The solar cell system of claim 7, further comprising a controller configured to charge a battery with a power generated from the first PV module and the second PV module based on a maximum power point tracking control.

12. A method of operating a converter comprising a magnetic material; a first circuit comprising a first winding surrounding the magnetic material, a first main switch connected to a first input voltage source, a first inductor connected to the first winding, and a clamp circuit; a second circuit comprising a second winding surrounding the magnetic material, a second main switch connected to a second input voltage source, and a second inductor connected to the second winding, wherein the clamp circuit comprises a clamp switch connected to the first main switch and a clamp capacitor between the clamp switch and the first inductor and connected in series with the clamp switch and the first inductor, and the method comprises:
- converting, by the first circuit, first power received from the first input voltage source to provide the converted first power to a load;
- resetting, by the clamp circuit, a power conversion operation;
- converting, by the second circuit, second power received from the second input voltage source to provide the converted second power to the load;
- turning on or turning off the first main switch and the second main switch at a same time; and
- operating the clamp switch complementary to the first main switch.

13. The method of claim 12, further comprising, during a first period:
- turning on the first main switch and the second main switch;
- generating a current flow in a closed circuit by the first circuit and the second circuit; and
- inducing a current flow between the first winding and the second winding coupled to each other.

14. The method of claim 13, further comprising, during a second period and a third period subsequent to the first period, turning off the first main switch and the second main switch to discharge electrical energy stored in the first inductor and the second inductor.

15. The method of claim 14, further comprising, during a fourth period subsequent to the third period, turning on the clamp switch to decrease a magnetizing current of the first circuit to a negative value until an offset of the magnetizing current is removed.

16. The method of claim 15, further comprising, during a fifth period subsequent to the fourth period, conducting the first main switch and the second main switch through a parasitic capacitor.

17. The method of claim 16, further comprising, in a sixth period subsequent to the fifth period, turning on the first main switch and the second main switch to allow the first circuit and the second circuit to be a zero voltage switching.

18. The method of claim 12, wherein the first input voltage source comprises a first photovoltaic (PV) module, and the second input voltage source comprises a second PV module.

19. The method of claim 12, wherein the first winding and the second winding are in a coupling state.

20. The method of claim 12, further comprising, during an unbalanced compensation period:
- turning on the first main switch and the second main switch;
- generating a current flow in a closed circuit by the first circuit and the second circuit; and
- inducing a current flow between the first winding and the second winding coupled to each other.

* * * * *